Dec. 26, 1967 R. D. HALL 3,359,808
STARTER DRIVE ARRANGEMENTS
Filed Aug. 31, 1965
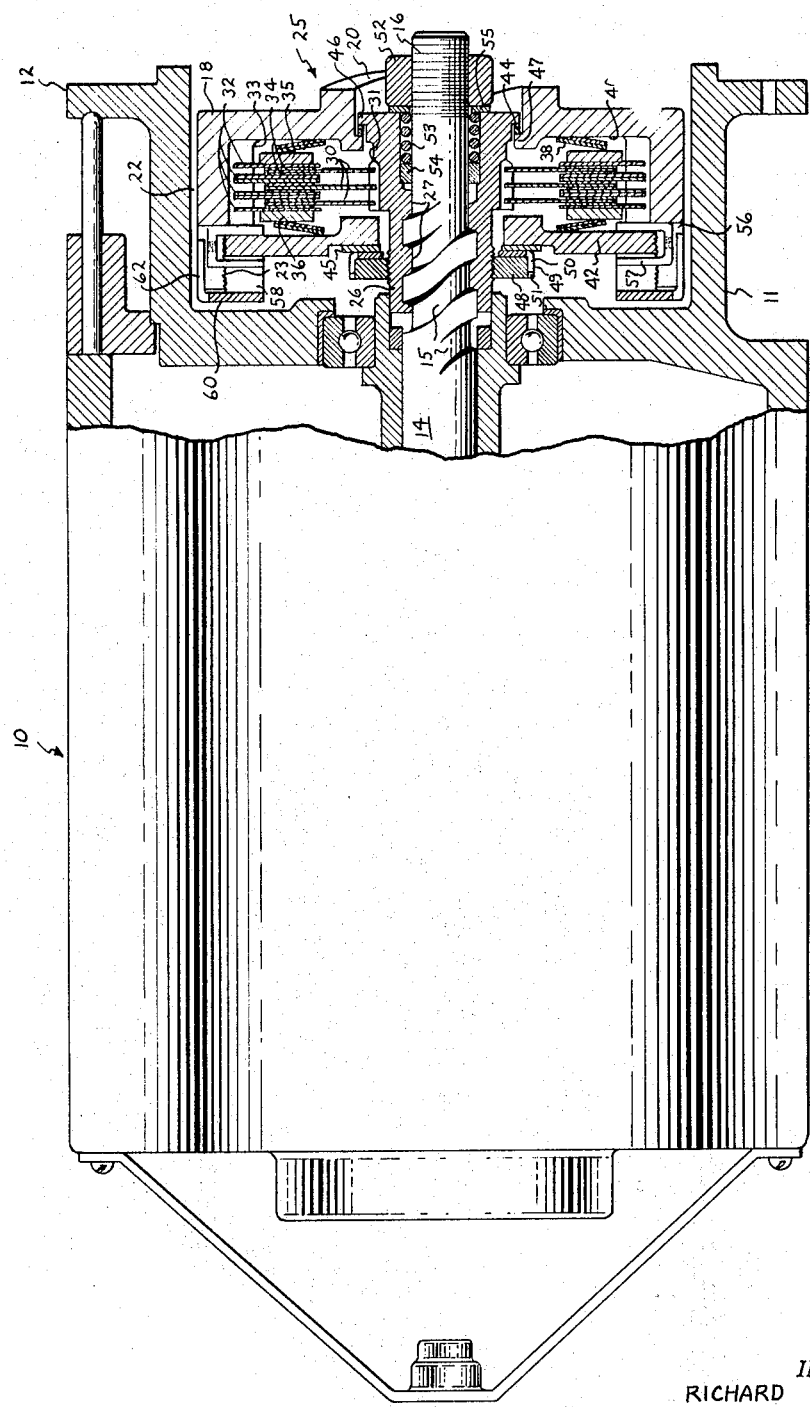
INVENTOR.
RICHARD D. HALL
BY *Joseph V. Claeys*
HIS ATTORNEY

United States Patent Office 3,359,808
Patented Dec. 26, 1967

3,359,808
STARTER DRIVE ARRANGEMENTS
Richard D. Hall, Erie, Pa., assignor to General Electric
Company, a corporation of New York
Filed Aug. 31, 1965, Ser. No. 483,941
7 Claims. (Cl. 74—7)

ABSTRACT OF THE DISCLOSURE

A starter drive having an adjustable clutch arrangement for transmitting torque from a starter motor to an engine. An adjusting nut is threaded onto an output torque-transmitting housing to adjust the maximum torque which can be transmitted by the clutch arrangement. U-shaped keys fit through slots in the housing and into keyways in the adjusting nut to prevent angular forces present when the starter motor is actuated from rotating the adjusting nut relative to the housing.

---

This invention relates to new and improved constant torque output starter drives.

The inertia screw advancing type of starter drive commonly used in starting machines, such as internal combustion engines, has an engaging jaw at one end of the electric motor armature shaft which moves outwardly into engagement with the engine upon energization of the starter motor. Friction damping devices of various designs have been incorporated in starter drives of such type for absorbing the shock due to the abrupt jolt created by the engaging action of the starter jaw with the engine. Such arrangements have been heavy and occupy valuable axial space which cannot be tolerated in aircraft applications, for example, where weight and axial space are such important considerations. Prior art attempts to modify such friction damping devices for aircraft applications, such as in starting gas turbine engines, have not been entirely satisfactory and such starters have, heretofore, been beset with various problems the most serious of which, such as engine shaft breakage, premature starter drive failure and costly maintenance, have been traced to the inability of such drives to provide for a constant torque output.

It is an object of this invention, therefore, to provide a starter drive which substantially overcomes one or more of the prior art difficulties.

It is another object of this invention to provide a starter drive which has a constant torque output, occupies a minimum of axial space and is light in weight.

It is yet another object of this invention to provide a starter drive having torque adjusting means which is unaffected by the angular forces created by the engaging action of the starter and an engine.

Briefly stated, in accordance with one aspect of this invention, an improved adjustable torque starter drive arrangement comprises a sleeve which is connected to the output shaft of a prime mover, such as the armature shaft of an electric starter motor, and arranged to be moved axially outwardly upon rotation of the shaft. There is also provided a hollow housing having engine engaging dogs at one end and an internally threaded portion at the other end. The hollow housing is yieldably coupled to the sleeve through a friction coupling device disposed within the housing so that the longitudinal and rotary movement imparted to the sleeve upon rotation of the shaft is imparted to the hollow housing. The friction coupling device includes friction adjusting means for varying the torque at the engine engaging dogs. There is further provided means for positively positioning the hollow housing axially with respect to the sleeve and means for by-passing the angular forces, created during the engaging action between the engine engaging dogs and the engine, around the friction adjusting means to prevent damage thereto during operation.

The novel features believed characteristic of the invention are set forth with particularity in the appended claims. The invention itself, however, together with its organization and method of operation, as well as further objects and advantages thereof, may best be understood by references to the following description taken in connection with the accompanying drawing in which the sole figure is a view in elevation, partly in section, showing an electric starter motor incorporating the starter drive of the present invention and wherein the arrangement of the parts is illustrated for the at rest position of the starter.

As shown in the single figure a dynamoelectric machine 10, which may be a direct current starter motor, is equipped at one end with a hollow extension 11 which terminates in the outwardly projecting flange 12 arranged for physically attaching the starter motor to an engine.

Starter motor 10 includes an armature shaft 14 which is provided with a plurality of spiral grooves 15 and terminates in a threaded portion 16. A hollow housing 18 is provided with engine engaging dogs 20 formed on its outer end for contacting mating grooves fixed in an end of the engine. The cylindrical end 22 opposite the dogs 20 is provided with an internally threaded portion 23.

Housing 18 is coupled through a multiple disc friction clutch arrangement, generally designated at 25, to a sleeve 26 which fits about the end of the armature shaft and is arranged for longitudinal and rotary movement on the end thereof. Sleeve 26 is provided with internal threads 27 which are arranged to ride in the spiral grooves 15 when armature shaft 14 is rotated thereby simultaneously imparting longitudinal and rotary movement to the sleeve 26.

In accordance with this invention constant torque is provided at the engine engaging dogs 20 by coupling this movement of the sleeve 26 through the clutch arrangement 25. To this end, a plurality of ring-shaped plates 30 are suitably affixed, such as by a spline, to the outer surface 31 of sleeve 26. In interleaved relation with the plates 30 are a plurality of annular plates 32 which may be similarly splined to the interior surface 33 of housing 18. Preferably, annular plates 30 are provided with sintered bronze faces 34 since in the embodiment illustrated an oil or "wet" environment prevails.

The friction plates 30 and 32 are kept flat and in the desired frictional contact by the pressure exerted thereon through the pressure plates 35 and 36 by Belleville washer means 38. As shown, two Belleville washers in parallel are positioned between the pressure plate 35 and the inside end or lateral face 40 of the housing 18 and two similarly arranged Belleville washers are positioned between the pressure plate 36 and an annular adjusting nut 42 threadably engaged with the internally threaded portion 23 of housing 18. Adjusting nut 42 is operative to set the spring pressure of the Belleville washers 38 so that the torque at the engine engaging dogs 20 may be adjusted to a desired value. Thus, if the engine is "stiff" or "frozen" the desired maximum torque to be applied thereto will not be exceeded since beyond the adjusted value the plates 30 and 32 will slip relative to each other thereby preventing damage to the engine and/or the started motor assembly.

Sleeve 26 is positively positioned with respect to the housing 18 by first and second thrust washers 44 and 45. To eliminate friction of steel-to-steel surfaces so as to contribute to a longer operating life, thrust washers 44 and 45 are preferably of a material having a low coefficient of friction such as bronze or the like. First thrust washer 44 is disposed between a shoulder 46 on sleeve 26 and a shoulder 47 on the end of housing 18. Second thrust washer 45 is disposed between the face of the adjusting nut 42 and a locknut 48 which is threaded onto the opposite end of the sleeve 26 from the shoulder 46 thereof. Locknut 48 is secured against movement by a lockplate 49, one or more tabs 50 of which may be positioned in keyways 51 provided therein.

In order that the starter drive assembly will remain on the armature sharft and be returned to its retracted position, a locknut 52 and bias spring 53 are provided. Locknut 52 is threaded onto the threaded portion 16 of armature shaft 14. Bias spring 53 is disposed within a recess in the end of sleeve 26 between the washer 54 within the recess and a washer 55 adjacent the locknut 52. Spring 53 exerts sufficient force to cause retraction of the engaging dogs 20 as soon as the engine becomes self-supporting.

At the precise moment of disengagement, no torque is being transmitted across the engine engaging jaws (from the starter motor to the engine and vice versa) thereby enabling the spring 53 to separate the engaged members. This action will take place even though the starter motor may continue to run at full speed. Since the engine engaging dogs are moved into position with the engine only during an initial acceleration period, continued running of the starter motor 10 will not operate to advance the dogs 20 thereof to an engaged position with the engine.

Means are also provided in the arrangement of the present invention to prevent the angular forces created by the engaging action of the starter and engine from affecting the operability of the adjusting nut 42. It has been found, for example, that such angular forces caused rotation and jamming of the adjusting nut making it almost impossible after a time to either readjust the friction of the clutch when required or to overhaul the starter drive without excessive parts replacement.

In the arrangement of the present invention the foregoing difficulties are obviated by a by-pass means which prevents the angular forces so created from being transmitted through the adjusting nut 42 so as to cause rotation thereof relative to the housing. The by-pass means is provided by a plurality of slots 56 provided through the outer surface at the cylindrical end of the housing 18 through which a plurality of U-shaped keys 57 are disposed. U-shaped keys 57 fit into the slots 56 of the housing 18 with the legs thereof fitting into keyways 58 in adjusting nut 42 so that such legs bridge or straddle the threaded portion of adjusting nut 42. The angular forces, therefore, are transmitted by means of the keys 57 thereby providing for a bypass about the threads of the adjusting nut 42 and preventing any damage thereto caused by excessive tightening due to rotation of the adjusting nut relative to the housing. Keys 57 may conveniently be prevented from falling out of the slots 56 of housing 18 by a suitable lockplate 60 having tabs 62 which may be bent down over the top of the slots 56 having keys 57 disposed therein. Lockplate 60 may be suitably secured to the outer face of adjusting nut 42 as by welding or the like.

The foregoing described starter drive earrangement, therefore, provides a constant torque output with means for torque adjustment when necessary and which is light in weight, occupies a minimum amount of axial space and has both long life as well as ease of maintenance. It will be understood that the torque forces necessary for satisfactory operation, which might be readily controlled in large devices where neither weight nor space are factors, must be controlled very closely in a drive arrangement which must be small enough to fit within the space available in the hollow extension 11, for example.

In operation, energization of starter motor 10 causes torque to be transmitted through the armature shaft 14, sleeve 26, clutch arrangement 25 and housing 18 to an engine or other machine to be started. Upon initiation of rotation of armature shaft 14, threads 27 in sleeve 26 are caused to travel in the spiral grooves 15 in aramature shaft 14. This causes sleeve 26 and housing 18, coupled to sleeve 26 through clutch arrangement 25, to move laterally to the right against the force of spring 53. When housing 18 reaches its extended position, the engine engaging dogs 20 are in position to effectively transmit torque from the starter motor to the engine.

As is well known, motors employed for starting engines from rest have extremely high starting torque and consequently housing 18 is accelerated at a very high rate. Accordingly, the engaging dogs 20 are caused to contact the mating parts in the engine with an impact due to the inertia of the housing 18. At the moment the dogs 20 engage the mating parts in the engine the starter motor will be at or near full speed while the engine is at standstill. Because of the friction coupling between sleeve 26 and the housing 18, the housing 18 and the sleeve 26 rotate as a unit with the armature shaft prior to engagement of the dogs 20 with the engine. When dogs 20 are in engagement with the engine, however, clutch arrangement 25 allows slippage between housing 18 and sleeve 26 if the load on housing 18 is at any time greater than that for which the clutch has been set by previous adjustment or adjusting nut 42. Accordingly, the torque transmitted to the engine through dogs 20 cannot exceed that provided by the friction setting of the clutch. Usually the clutch is adjusted so that during a normal start, the load at the instant of impact causes the clutch to slip until the engine rotates. In an instance where an engine may be very "stiff" or "frozen," therefore, the torque limit allows the clutch to slip thereby preventing engine shaft breakage or other damage to either the engine, drive arrangement or starter. If at any time the maximum torque limit changes due to any of a number of reasons, such as wear of the friction plates 30 and 32, changes in the deflection of the Belleville washers 38 or if it is desired to provide a different torque limit, it is only necessary to adjust adjusting nut 42 to change the pressure applied to the plates 30 and 32. It will be apparent that this simple adjustment can also readily provide for such things as, for example, changes in coefficient of friction, atmospheric conditions, tolerance buildup of parts and the like during manufacture of such starter drives so that all such drives may be very readily produced with a desired constant torque limit.

Only a preferred embodiment of the invention has been described in detail herein and accordingly many changes and modifications will readily occur to those skilled in the art. It is to be understood, therefore, that the appended claims are intended to cover all such changes and modifications as fall within the true spirit and scope of the invention.

What I claim as new and desire to secure by Letters Patent of the United States is:

1. An adjustable torque starter drive arrangement for connection to the output shaft of a prime mover utilized in starting machines, the combination comprising:

(a) a sleeve connected to the end of said output shaft, said sleeve having spiral grooves which mate with spiral threads on said output shaft so that said sleeve is arranged to be moved axially outwardly upon rotation of said shaft;

(b) a hollow housing having engine engaging dogs at one end thereof;

(c) a friction coupling device disposed within said hollow housing and operative to yieldably couple said hollow housing to said sleeve, said friction coupling device including friction adjusting means for varying the maximum torque limit of said friction coupling device;

(d) means for positively axially positioning said hollow housing with respect to said sleeve; and (e) force by-pass means for preventing the angular forces created during the engaging action from causing rotation of said friction adjusting means.

2. The adjustable torque starter drive arrangement of claim 1 wherein said friction coupling device is a multiple disc clutch.

3. The adjustable torque starter drive arrangement of claim 2 wherein said multiple disc clutch comprises:
   (a) a plurality of first annular plates affixed to the outer surface of said sleeve;
   (b) a plurality of second annular plates in interleaved relation with said first annular plates and affixed to the inner surface of said hollow housing;
   (c) first Belleville washer means disposed between a lateral face of said hollow housing and one end of said plurality of interleaved annular plates;
   (d) an annular adjusting nut threadably disposed within said hollow housing at the end thereof opposite said engine engaging dogs; and
   (e) second Belleville washer means disposed between the face of said adjusting nut and the other end of said plurality of interleaved annular plates so that movement of said adjusting nut is operative to vary the pressure applied by said Belleville washer means to said interleaved annular plates.

4. The adjustable torque starter drive arrangement of claim 2 wherein said by-pass means comprises a plurality of U-shaped keys disposed through slots in said hollow housing and arranged so that the legs of said keys bridge across the threads of said adjusting nut and prevent rotation of said adjusting nut relative to said housing.

5. An adjustable torque starter drive arrangement for connection to the output shaft of a prime mover utilized in starting machines, the combination comprising:
   (a) a sleeve connected to said output shaft said sleeve having internal spiral grooves which mate with spiral threads on said output shaft so that said sleeve is arranged to be moved axially outwardly upon rotation of said shaft;
   (b) a hollow housing having engine engaging dogs at one end thereof and an internally threaded portion at the other end;
   (c) multiple disc friction clutch means disposed within said housing and arranged to yieldably couple said housing to said sleeve for movement therewith, said friction clutch means including friction adjusting means for varying the pressure applied to said friction discs, said means including an adjusting nut threadably engaged with the internally threaded portion at said other end of said hollow housing;
   (d) means for positively positioning said hollow housing axially with respect to said sleeve; and
   (e) means for by-passing the angular forces created during the engine engaging operation around said adjusting nut to prevent damage thereto due to rotation of said adjusting nut relative to said housing.

6. The adjustable torque starter drive arrangement of claim 5 wherein said friction clutch adjusting means comprises Belleville washers disposed at either end of said friction plates.

7. The adjustable torque starter drive arrangement of claim 6 wherein said means for by-passing said angular forces around said adjusting nut comprises a plurality of U-shaped keys disposed within slots in the end of said hollow housing and with the legs thereof arranged to bridge across the threads of said adjusting nut.

References Cited
UNITED STATES PATENTS 2,845,054   7/1958   Palfreyman et al. _____ 74—7

MILTON KAUFMAN, *Primary Examiner.*